(12) United States Patent
Guan et al.

(10) Patent No.: US 12,355,296 B2
(45) Date of Patent: Jul. 8, 2025

(54) PLAYBACK CONTROL SYSTEM AND POWER SUPPLY METHOD FOR SAME

(71) Applicant: BOE Technology Group Co., Ltd., Beijing (CN)

(72) Inventors: Enhui Guan, Beijing (CN); Liang Li, Beijing (CN); Xinyi Cheng, Beijing (CN); Youxiang Xia, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/030,768

(22) PCT Filed: Apr. 29, 2022

(86) PCT No.: PCT/CN2022/090299
§ 371 (c)(1),
(2) Date: Apr. 6, 2023

(87) PCT Pub. No.: WO2023/206368
PCT Pub. Date: Nov. 2, 2023

(65) Prior Publication Data
US 2024/0372399 A1    Nov. 7, 2024

(51) Int. Cl.
*H02J 9/06* (2006.01)
(52) U.S. Cl.
CPC ..................................... *H02J 9/06* (2013.01)
(58) Field of Classification Search
CPC ........................................................ H02J 9/06
USPC ............................................. 307/64, 44, 46
See application file for complete search history.

(56) References Cited

U.S. PATENT DOCUMENTS

| | | | |
|---|---|---|---|
| 7,825,539 B2* | 11/2010 | Ye | G06F 1/263 307/44 |
| 2006/0277589 A1* | 12/2006 | Margis | H04H 20/62 348/E7.003 |
| 2021/0135486 A1 | 5/2021 | Liu et al. | |

FOREIGN PATENT DOCUMENTS

| | | |
|---|---|---|
| CN | 101207300 A | 6/2008 |
| CN | 101719687 A | 6/2010 |
| CN | 108808842 A | 11/2018 |
| CN | 112667448 A | 4/2021 |
| CN | 112751325 A | 5/2021 |
| CN | 114301154 A | 4/2022 |

* cited by examiner

*Primary Examiner* — Michael R. Fin
(74) *Attorney, Agent, or Firm* — IPro, PLLC

(57) ABSTRACT

Provided is a playback control system, including a first playback control device, a second playback control device, a first power supply circuit, a second power supply circuit, and a power supply. The first power supply circuit is configured to supply power to the first playback control device using a first utility power. The second power supply circuit is configured to supply power to the second playback control device using the first utility power. The power supply is configured to supply power to a first target playback control device in response to a power failure in a first target power supply circuit. The first target power supply circuit is the first power supply circuit. The first target playback control device is the first playback control device. Alternatively, the first target power supply circuit is the second power supply circuit. The first target playback control device is the second playback control device.

19 Claims, 6 Drawing Sheets

PLAYBACK CONTROL SYSTEM AND POWER SUPPLY METHOD FOR SAME

CROSS-REFERENCE TO RELATED APPLICATION

The present disclosure is a U.S. national stage of international application No. PCT/CN2022/090299, filed on Apr. 29, 2022, the content of which is herein incorporated by reference in its entirety.

TECHNICAL FIELD

The present disclosure relates to the field of power management technologies, and in particular, relates to a playback control system and a power supply method for the same.

BACKGROUND OF THE INVENTION

Typically, a playback system includes a playback control device and a display device. The playback control device is configured to control display on the display device. Where the playback control device is normally power supplied, the display device normally displays image data; and where the playback control device fails to be normally power supplied, the display device fails to normally display image data.

SUMMARY OF THE INVENTION

Embodiments of the present disclosure provide a playback control system and a power supply method for the same.

According to some embodiments of the present disclosure, a playback control system is provided. The system includes: a first playback control device, a second playback control device, a first power supply circuit, a second power supply circuit, and a power supply; wherein the first playback control device and the second playback control device are configured to control display on a same display device; the first power supply circuit is connected to the first playback control device, and configured to supply power to the first playback control device using a first utility power; the second power supply circuit is connected to the second playback control device, and configured to supply power to the second playback control device using the first utility power; and the power supply is connected to the first playback control device and the second playback control device, and configured to supply power to a first target playback control device in response to a power failure in a first target power supply circuit; wherein the first target power supply circuit is the first power supply circuit, and the first target playback control device is the first playback control device; or, the first target power supply circuit is the second power supply circuit, and the first target playback control device is the second playback control device.

In some embodiments, the power supply is further configured to stop supplying power to the first target playback control device in response to a power resumption of the target power supply circuit.

In some embodiments, the system further includes a third power supply circuit and a fourth power supply circuit; wherein the third power supply circuit is connected to the first playback control device, and configured to supply power to the first playback control device using a second utility power; and the fourth power supply circuit is connected to the second playback control device, and configured to supply power to the second playback control device using the second utility power.

In some embodiments, the second utility power and the first utility power belong to different suppliers and/or power supply stations; and at a same instant, at least one of the first power supply circuit and the third power supply circuit supplies power to the first playback control device, and at least one of the second power supply circuit and the fourth power supply circuit supplies power to the second playback control device.

In some embodiments, the power supply is further configured to supply power to the first playback control device in response to a power failure in a process of supplying power to the first playback control device by the third power supply circuit; or configured to supply power to the second playback control device in response to a power failure in a process of supplying power to the second playback control device by the fourth power supply circuit.

In some embodiments, a second target power supply circuit in the first power supply circuit and the second power supply circuit is configured to stop supplying power to a second target playback control device in response to the power failure in the first target power supply circuit and the power supply supplying power to the first target playback control device, wherein the second target power supply circuit is a power supply circuit in the first power supply circuit and the second power supply circuit other than the first target power supply circuit, and the second target playback control device is a playback control device connected to the second target power supply circuit; the third power supply circuit is configured to supply power to the first playback control device in response to the power supply supplying power to the first target playback control device; and the fourth power supply circuit is configured to supply power to the second playback control device in response to the power supply supplying power to the first target playback control device.

In some embodiments, the power supply is further configured to supply power to at least one of the first playback control device and the second playback control device in response to the first power supply circuit supplying power to the first playback control device and the second power supply circuit supplying power to the second playback control device; the third power supply circuit is further configured to supply power to the first playback control device in response to a power failure in the first power supply circuit and the power supply supplying power to at least one of the first playback control device and the second playback control device; and the fourth power supply circuit is further configured to supply power to the second playback control device in response to a power failure in the second power supply circuit and the power supply supplying power to at least one of the first playback control device and the second playback control device.

In some embodiments, the power supply is further configured to stop supplying power to the first playback control device and the second playback control device in response to the third power supply circuit supplying power to the first playback control device and the fourth power supply circuit supplying power to the second playback control device.

In some embodiments, the system further comprises a connector, wherein components in front of and behind the connector are electrically connected to each other by arranging the connector in at least one of following positions: between the first power supply circuit and the first playback control device; between the second power supply circuit and the second playback control device; between the third power supply circuit and the first playback control device; between the fourth power supply circuit and the second playback control device; between the power supply and the first playback control device; and between the power supply and the second playback control device.

In some embodiments, the system further comprises a protection circuit, wherein the protection circuit comprises a diode, or the protection circuit comprises a plurality of diodes connected in parallel; and the protection circuit is arranged in at least one of following positions: between the first power supply circuit and the first playback control device; between the second power supply circuit and the second playback control device; between the third power supply circuit and the first playback control device; between the fourth power supply circuit and the second playback control device; between the power supply and the first playback control device; and between the power supply and the second playback control device.

According to some embodiments of the present disclosure, a power supply method for a playback control system is provided. The method applies to the system as defined in claim 1, and the method includes: supplying power to a first playback control device by a first power supply circuit and simultaneously supplying power to a second playback control device by a second power supply circuit; and supplying power to a first target playback control device by a power supply in response to a power failure in a first target power supply circuit; wherein the first target power supply circuit is the first power supply circuit, and the first target playback control device is the first playback control device; or, the first target power supply circuit is the second power supply circuit, and the first target playback control device is the second playback control device.

In some embodiments, the method further includes: in response to a power resumption of the first target power supply circuit, stopping supplying power to the first target playback control device by the power supply.

In some embodiments, the method further includes: supplying power to the first playback control device by the power supply in response to a power failure in a process of supplying power to the first playback control device by a third power supply circuit; or supplying power to the second playback control device by the power supply in response to a power failure in a process of supplying power to the second playback control device by a fourth power supply circuit.

In some embodiments, the method further includes: stopping supplying power to a second target playback control device by a second target power supply circuit, wherein the second target power supply circuit is a power supply circuit in the first power supply circuit and the second power supply circuit other than the first target power supply circuit, and the second target playback control device is a playback control device connected to the second target power supply circuit; and supplying power to the first playback control device by a third power supply circuit, and simultaneously supplying power to the second playback control device by a fourth power supply circuit.

In some embodiments, the method further includes: supplying power to at least one of the first playback control device and the second playback control device by the power supply in response to the first power supply circuit supplying power to the first playback control device and the second power supply circuit supplying power to the second playback control device; stopping supplying power to the first playback control device by the first power supply circuit, and stopping supplying power to the second control device by the second power supply circuit; and supplying power to the first playback control device by a third power supply circuit, and simultaneously supplying power to the second playback control device by a fourth power supply circuit.

In some embodiments, the method further includes: stopping supplying power to the first playback control device and the second playback control device by the power supply.

BRIEF DESCRIPTION OF DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

DETAILED DESCRIPTION

The present disclosure is described in further detail with reference to the accompanying drawings, to clearly present the objects, technical solutions, and advantages of the present disclosure.

In some practices, a playback control system includes a first power supply circuit, a second power supply circuit, and a playback control device. The first power supply circuit and the second power supply circuit are configured to supply power to the playback control device, and the playback control device is configured to control the display on the display device. Where one of the first power supply circuit and the second power supply circuit fails, the other takes over the failed one to supply power to the playback control device.

During the switchover between the first power supply circuit and the second power supply circuit, the playback control device is subject to a transient power loss. Consequently, the display on the display device is interrupted, and thus reliability of the playback control system is low.

Figure 1:
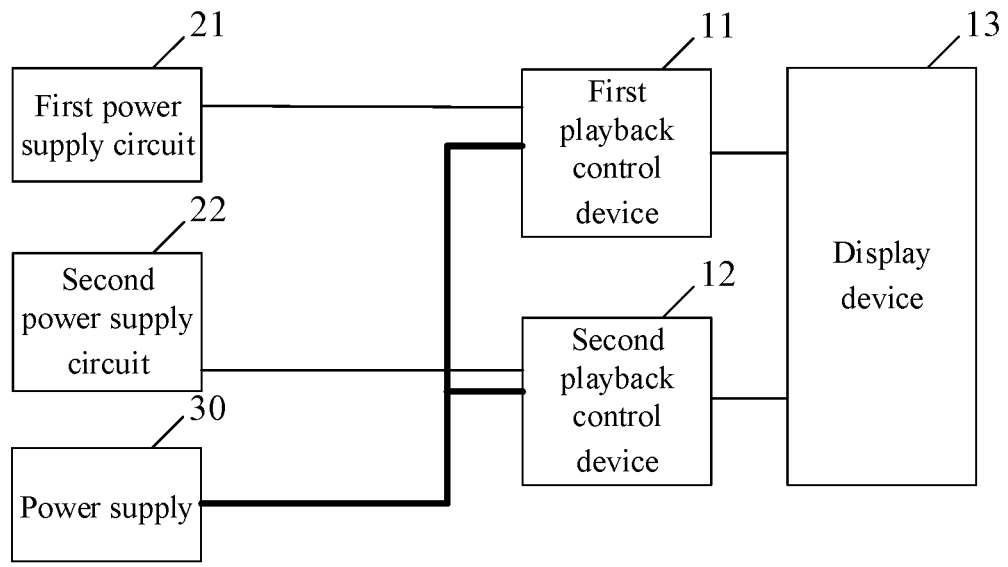
FIG. 1 is a schematic structural diagram of a playback control system according to some embodiments of the present disclosure.

FIG. 1 is a schematic structural diagram of a playback control system according to some embodiments of the present disclosure. As illustrated in FIG. 1, the playback control system includes a first playback control device 11, a second playback control device 12, a first power supply circuit 21, a second power supply circuit 22, and a power supply 30.

The first power supply circuit 21 is connected to the first playback control device 11, and configured to supply power to the first playback control device 11 using a first utility power. The second power supply circuit 22 is connected to the second playback control device 12, and configured to supply power to the second playback control device 12 using the first utility power. The power supply 30 is connected to the first playback control device 11 and the second playback control device 12.

The power supply 30 is configured to supply power to a first target playback control device in response to a power failure in a first target power supply circuit. The first target power supply circuit is one of the first power supply circuit 21 and the second power supply circuit 22. In the case that the first target power supply circuit is the first power supply circuit 21, the first target playback control device is the first playback control device 11. In the case that the first target power supply circuit is the second power supply circuit 22, the first target playback control device is the second playback control device 12.

In some embodiments of the present disclosure, the first playback control device 11 and the second playback control device 12 are connected to a display device 13, and configured to control the display on the display device 13. Herein, one of the first playback control device 11 and the second playback control device 12 is a primary playback control device and the other is a secondary playback control device. In the case that one of the first playback control device 11 and the second playback control device 12 does not operate normally, the other controls the display on the display device 13 to avoid display interruption, such that reliability of the playback control system is ensured.

For example, during a power failure in the first power supply circuit 21, the second power supply circuit 22 supplies power normally, such that the second playback control device 12 is in a powered state, and thus the second playback control device 12 continues to control the display device 13 to normally display image data; and during a power failure in the second power supply circuit 22, the first power supply circuit 21 supplies power normally, such that the first playback control device 11 is in a powered state, and thus the first playback control device 12 continues to control the display device 13 to normally display image data. Therefore, the reliability of the playback control system is improved by using two power supply circuits and two playback control devices.

In response to the power failure in the first target power supply circuit, the first target playback control device is powered by the power supply 30, such that both the first playback control device 11 and the second playback control device 12 are in the powered state. In this way, during a power failure in the power supply 30 or a power failure in the other of the first power supply circuit 21 and the second power supply circuit 22, one of the first playback control device 11 and the second playback control device 12 is still in the powered state and continues to control the display device 13 to normally display image data, such that the reliability of the playback control system is further improved.

In some embodiments of the present disclosure, during the power failure in the first power supply circuit and switching the power supply to supply power to the first playback control device, the display device is still in a normal display state because the second power supply circuit supplies power to the second playback control device. Similarly, during the power failure in the second power supply circuit and switching the power supply to supply power to the second playback control device, the display device is still in the normal display state because the first power supply circuit supplies power to the first playback control device. In this way, at least one of the first playback control device and the second playback control device is powered, such that the display device is ensured to be always in the normal display state, and thus the reliability of the playback control system is improved.

Exemplarily, the first playback control device 11 and the second playback control device 12 are open pluggable specification (OPS) devices. For example, the OPS device is a personal computer. Exemplarily, the display device 13 includes a display, such as a light-emitting diode (LED) display. Exemplarily, the power supply is an uninterrupted power supply (UPS), a storage battery, or a battery in other forms.

Optionally, in some embodiments of the present disclosure, the power supply 30 is further configured to stop supplying power to the first target playback control device in response to a power resumption of the first target power supply circuit.

For example, the first playback control device 11 is powered by the power supply 30 upon the power failure in the first power supply circuit 21. Upon a power resumption of the first power supply circuit 21, the power supply 30 is stopped from supplying power to the first playback control device 11, and the first power supply circuit 21 continues to supply power to the first playback control device 11.

In some examples, a first connector and a second connector are respectively arranged on the first playback control device 11 and the second playback control device 12. Exemplarily, the first connector and the second connector are quick connectors. The quick connector generally refers to a quick coupling, which is capable of achieving connection or disconnection without any tool. The power supply 30 is connected to the first playback control device 11 via the first connector, and the power supply 30 is connected to the second playback control device 12 via the second connector.

In other examples, a first switch unit and a second switch unit are respectively connected between the power supply 30 and the first playback control device 11 and between the power supply 30 and the second playback control device 12. The first switch unit is in an on-state in the case that the power supply 30 supplies power to the first playback control device 11, and the second switch unit is in an on-state in the case that the power supply 30 supplies power to the second playback control device 12.

In still other examples, the first connector and the second connector are respectively arranged on the first playback control device 11 and the second playback control device 12. The power supply 30 is connected to the first playback control device 11 via the first connector, and the power supply 30 is connected to the second playback control device 12 via the second connector. Meanwhile, the first switch unit and the second switch unit are respectively connected between the power supply 30 and the first playback control device 11 and between the power supply 30 and the second playback control device 12.

The power supply 30 is stopped from supplying power to the first playback control device 11 by disconnecting the power supply 30 from the first connector; and the power supply 30 is stopped from supplying power to the second playback control device 12 by disconnecting the power supply 30 from the second connector. Alternatively, the power supply 30 is stopped from supplying power to the first playback control device 11 by disconnecting the first switch unit; and the power supply 30 is stopped from supplying power to the second playback control device 12 by disconnecting the second switch unit.

In the case that the power supply 30 is always employed to supply power to the playback control device, because the power of the power supply 30 is limited, the power supply 30 fails to supply power to the playback control device due to insufficient power. Therefore, the reliability of the playback control system is further improved by stopping the power supply from supplying power upon the power resumption of the first target power supply circuit.

Figure 2:
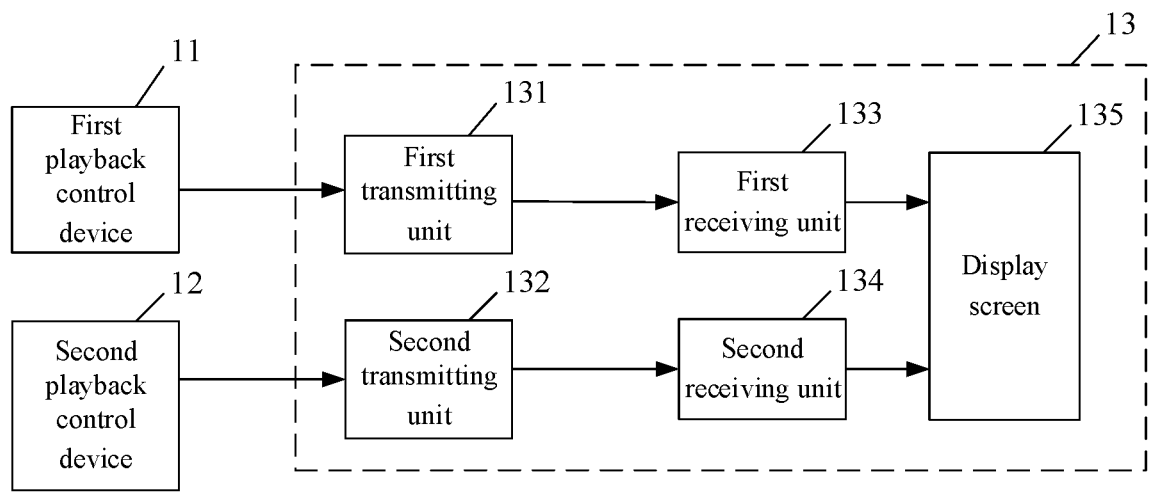
FIG. 2 is a schematic structural diagram of a display device according to some embodiments of the present disclosure.

FIG. 2 is a schematic structural diagram of a display device according to some embodiments of the present disclosure. As illustrated in FIG. 2, the display device includes a first transmitting unit 131, a second transmitting unit 132, a first receiving unit 133, a second receiving unit 134, and a display screen 135.

The first transmitting unit 131 is connected to the first playback control device 11 and the first receiving unit 133. The first receiving unit 133 is connected to the display screen 135. The first playback control device 11 transmits image data to the first transmitting unit 131, and the first transmitting unit 131 processes the image data and transmits the processed image data to the first receiving unit 133. The first receiving unit 133 converts the image data into drive signals to drive the display screen 135 to display the image data.

The second transmitting unit 132 is connected to the second playback control device 12 and the second receiving unit 134. The second receiving unit 134 is connected to the display screen 135. The second playback control device 12 transmits image data to the second transmitting unit 132, and the second transmitting unit 132 processes the image data and transmits the processed image data to the second receiving unit 134. The second receiving unit 134 converts the image data into drive signals to drive the display screen 135 to display the image data.

Exemplarily, the first transmitting unit 131 and the second transmitting unit 132 are transmitters, and the first receiving unit 133 and the second receiving unit 134 are receivers.

Exemplarily, the first playback control device 11 is connected to the first transmitting unit 131 and the second playback control device 12 is connected to the second transmitting unit 132 via a high-definition multimedia interface (HDMI). The first transmitting unit 131 is connected to the first receiving unit 133 and the second transmitting unit 132 is connected to the second receiving unit 134 via an Ethernet (ETH) interface.

It should be noted that in some embodiments of the present disclosure, in the case that the first playback control device 11 and the second playback control device 12 are powered at the same time, one of the first playback control device 11 and the second playback control device 12 controls the display on the display device; in the case that the first playback control device 11 is powered and the second playback control device 12 is not powered, the first playback control device 11 controls the display on the display device. In the case that the first playback control device 11 is not powered and the second playback control device 12 is powered, the second playback control device 12 controls the display on the display device.

Figure 3:
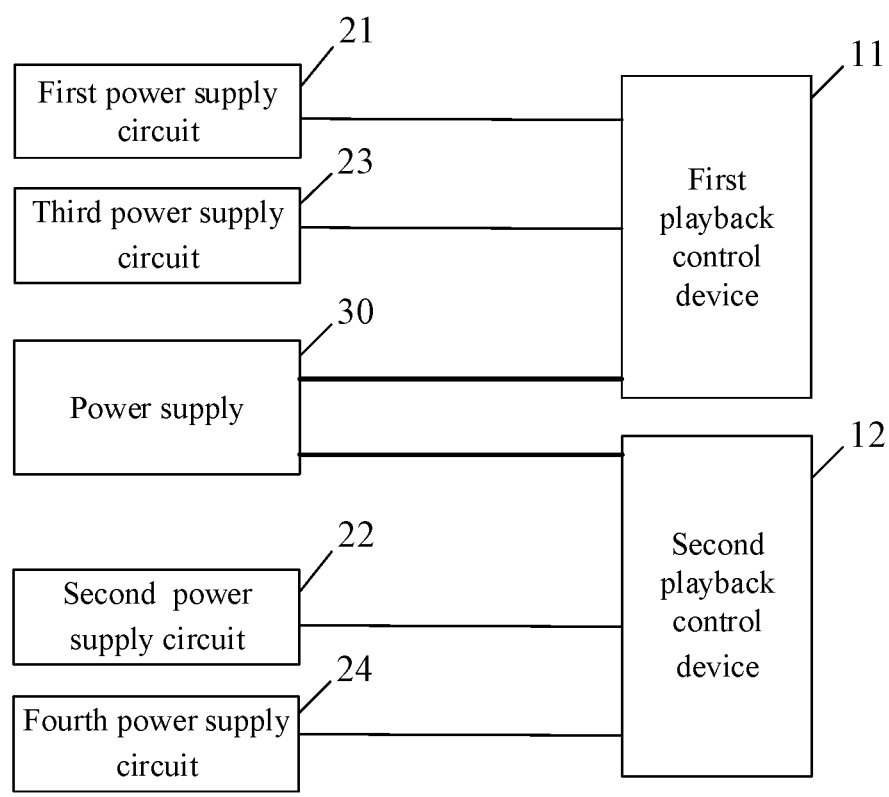
FIG. 3 is a schematic structural diagram of another playback control system according to some embodiments of the present disclosure.

FIG. 3 is a schematic structural diagram of another playback control system according to some embodiments of the present disclosure. As illustrated in FIG. 3, the system includes the first playback control device 11, the second playback control device 12, the first power supply circuit 21, the second power supply circuit 22, a third power supply circuit 23, a fourth power supply circuit 24, and the power supply 30.

The first power supply circuit 21 and the third power supply circuit 23 are connected to the first playback control device 11. The first power supply circuit 21 is configured to supply power to the first playback control device 11 using the first utility power, and the third power supply circuit 23 is configured to supply power to the first playback control device 11 using a second utility power.

The second power supply circuit 22 and the fourth power supply circuit 24 are connected to the second playback control device 12. The second power supply circuit 22 is configured to supply power to the second playback control device 12 using the first utility power, and the fourth power supply circuit 24 is configured to supply power to the second playback control device 12 using the second utility power.

The first utility power and the second utility power belong to the same supplier and/or power supply station. Alternatively, the first utility power and the second utility power belong to different suppliers and/or power supply stations. Exemplarily, the first utility power and the second utility power are 220 V three-phase alternating-current (AC) power.

Exemplarily, the first power supply circuit 21, the third power supply circuit 23, the second power supply circuit 22, and the fourth power supply circuit 24 are 220 V power supply boxes that output 220 V AC power.

It should be noted that, at the same instant, at least one of the first power supply circuit 21 and the third power supply circuit 23 supplies power to the first playback control device 11, and at least one of the second power supply circuit 22 and the fourth power supply circuit 24 supplies power to the second playback control device 12.

In response to a power failure in one of the first power supply circuit 21 and the third power supply circuit 23, the other is employed to supply power to the first playback control device 11. In response to a power failure in one of the second power supply circuit 22 and the fourth power supply circuit 24, the other is employed to supply power to the second playback control device 12. Therefore, the reliability of the playback control system is improved by providing two power supply circuits for each of the playback control devices.

In some embodiments, the first playback control device 11 is powered by the first power supply circuit 21, and simultaneously the second playback control device 12 is powered by the second power supply circuit 22. The first utility power and the second utility power belong to different suppliers and/or power supply stations.

The power supply 30 is further configured to supply power to the first target playback control device in response to the power failure in the first target power supply circuit. The first target power supply circuit is one of the first power supply circuit 21 and the second power supply circuit 22. In the case that the first target power supply circuit is the first power supply circuit 21, the first target playback control device is the first playback control device 11. In the case that the first target power supply circuit is the second power supply circuit 22, the first target playback control device is the second playback control device 12.

A second target power supply circuit is configured to stop supplying power to a second target playback control device in response to the power failure in the first target power supply circuit and the power supply 30 supplying power to the first target playback control device. The second target power supply circuit is a power supply circuit other than the first target power supply circuit in the first power supply circuit 21 and the second power supply circuit 22, and the second target playback control device is a playback control device connected to the second target power supply circuit.

The third power supply circuit 23 is configured to supply power to the first playback control device 11 in response to the power supply 30 supplying power to the first target playback control device. The fourth power supply circuit 24 is configured to supply power to the second playback control device 11 in response to the power supply 30 supplying power to the first target playback control device.

During the power failure in the first target power supply circuit, the second target power supply circuit supplies power to the second target playback control device, and thus the second target playback control device continues to control the display on the display device. Upon stopping supplying power to the second target playback control device by the second target power supply circuit, and during switching the third power supply circuit 23 to supply power to the first playback control device 11 and switching the fourth power supply circuit 24 to supply power to the second playback control device 12, the power supply 30 supplies power to the first target playback control device, and thus the first target playback control device continues to control the display on the display device. In this way, at least one of the first playback control device 11 and the second playback control device 12 is ensured to be powered, such that the display device is ensured to be always in the normal display state, and the reliability of the playback control system is improved.

Exemplarily, in the case that the power supply 30 has steadily supplied power to the first playback control device 11, the second target power supply circuit is stopped from supplying power to the second target playback control device. In this way, abnormal power supplied to the first playback control device 11 or the second playback control device 12 caused by the unstable power supply of the power supply 30 is avoided, such that the display device is prevented from abnormally displaying image data.

In some examples, during the power failure in the first power supply circuit 21, the third power supply circuit 23 uses the second utility power, the second power supply circuit 22 uses the first utility power, and the first utility power and the second utility power belong to different suppliers and/or power supply stations. Therefore, in the case that the third power supply circuit 23 is used to supply power to the first playback control device 11, power supply voltages of the first playback control device 11 and the second playback control device 12 are different. In the case that the first playback control device 11 and the second playback control device 12 are switched to control the display device, the display device fails to normally display image data due to a difference between the power supply voltages of the first playback control device 11 and the second playback control device 12. Accordingly, in the embodiments of the present disclosure, in response to the power failure in one of the first power supply circuit 21 and the second power supply circuit 22, the third power supply circuit 23 is directly switched to supply power to the first playback control device 11, and the fourth power supply circuit 24 is directly switched to supply power to the second playback control device 12.

Optionally, in the embodiments, the power supply 30 is further configured to stop supplying power to the first playback control device 11 and the second playback control device 12 in response to the third power supply circuit 23 supplying power to the first playback control device and the fourth power supply circuit 24 supplying power to the second playback control device.

In the case that the power supply 30 is always employed to supply power to the playback control devices, because the power of the power supply 30 is limited, the power supply 30 fails to supply power to the playback control device due to insufficient power. Therefore, the power supply 30 is stopped from supplying power to the first playback control device 11 and the second playback control device 12 in response to the third power supply circuit 23 and the fourth power supply circuit 24 supplying power, such that the reliability of the playback control system is further improved.

Exemplarily, the power supply 30 is stopped from supplying power to the first playback control device 11 and the second playback control device 12, in the case that the third power supply circuit 23 and the fourth power supply circuit 24 have steadily supplied power. In this way, abnormal power supplied to the first playback control device 11 or the second playback control device 12 caused by the unstable power supply of the third power supply circuit 23 or the fourth power supply circuit 24 is avoided, such that the display device is prevented from abnormally displaying image data.

Figure 4:
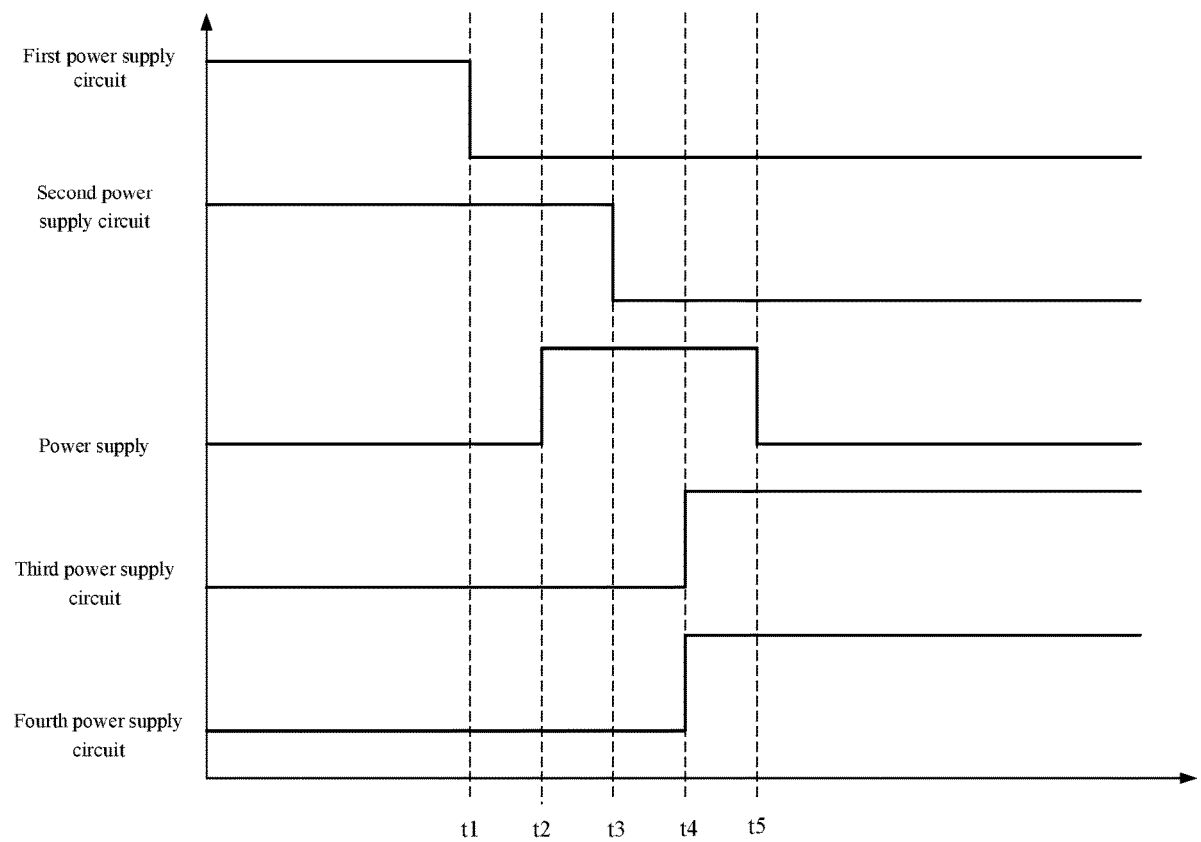
FIG. 4 is a power supply sequence diagram according to some embodiments of the present disclosure.

The power supply process in the embodiments of the present disclosure is described by the following examples. FIG. 4 is a power supply sequence diagram according to some embodiments of the present disclosure. In FIG. 4, a high level refers to a power supply state, and a low level refers to a power failure state.

As illustrated in FIG. 4, prior to an instant t1, the first playback control device 11 is powered by the first power supply circuit 21, and simultaneously the second playback control device 12 is powered by the second power supply circuit 22. In this case, one of the first playback control device 11 and the second playback control device 12 controls the display on the display device.

At the instant t1, the first power supply circuit 21 fails to supply power to the first playback control device 11 due to the power failure in the first power supply circuit 21, but the second power supply circuit 22 is in the power supply state, such that the second power supply circuit 22 supplies power to the second playback control device 12, and thus the second playback control device 12 controls the display on the display device.

At an instant t2, the first playback control device 11 is powered by the power supply 30. In this case, a power supply state of the power supply 30 is unstable.

At an instant t3, the power supply state of the power supply 30 is stable, and in this case, the second power supply circuit 22 is stopped from supplying power to the second playback control device 12, but the power supply 30 supplies power to the first playback control device 11, and thus the first playback control device 11 controls the display on the display device.

At an instant t4, the first playback control device 11 is powered by the third power supply circuit 23, and simultaneously the second playback control device 12 is powered by the fourth power supply circuit 24. In this case, power supply states of the third power supply circuit 23 and the fourth power supply circuit 24 are unstable.

At an instant t5, the power supply states of the third power supply circuit 23 and the fourth power supply circuit 24 are stable, and in this case, the power supply 30 is stopped from supplying power. The display on the display device is controlled by one of the first playback control device 11 and the second playback control device 12.

Optionally, in other examples, the instants t3 and t4 are the same. That is, the second power supply circuit 22 is stopped from supplying power, and simultaneously the third power supply circuit 23 and the fourth power supply circuit 24 supply power.

At least one of the first playback control device 11 and the second playback control device 12 is powered steadily by stopping the second power supply circuit 22 from supplying power in the case that the power supply 30 has supplied power steadily and stopping the power supply 30 from supplying power in the case that the third power supply circuit 23 and the fourth power supply circuit 24 have supply power steadily, such that at least one of the first playback control device 11 and the second playback control device 12 is still capable of operating normally even in case of voltage fluctuations, and thus the stability of the playback control system is improved.

In other embodiments, the first playback control device 11 is powered by the first power supply circuit 21, at the same time, the second playback control device 12 is powered by the second power supply circuit 22.

The power supply 30 is further configured to supply power to at least one of the first playback control device 11 and the second playback control device 12 in response to the first power supply circuit 21 supplying power to the first playback control device 11 and the second power supply circuit 22 supplying power to the second playback control device 12.

For example, the power supply 30 supplies power to only the first playback control device 11, only the second playback control device 12, or both the first playback control device 11 and the second playback control device 12.

In practice, in the case that a voltage of one of the first utility power or the second utility power is unstable, it is necessary to switch to the other.

The third power supply circuit 23 is configured to supply power to the first playback control device 11 in response to the power failure in the first power supply circuit 21 and the power supply 30 supplying power to at least one of the first playback control device 11 and the second playback control device 12.

The fourth power supply circuit 24 is configured to supply power to the second playback control device 12 in response to the power failure in the second power supply circuit 22 and the power supply 30 supplying power to at least one of the first playback control device 11 and the second playback control device 12.

In the case that the first power supply circuit 21 supplies power to the first playback control device 11 and the second power supply circuit 22 supplies power to the second playback control device 12, at least one of the first playback control device 11 and the second playback control device 12 is powered by the power supply 30. In this way, during the power failures in the first power supply circuit 21 and the second power supply circuit 22, and during switching the third power supply circuit 23 to supply power to the first playback control device 11 and switching the fourth power supply circuit 24 to supply power to the second playback control device 12, the supply power is capable of supplying power to at least one of the first playback control device 11 and the second playback control device 12. Therefore, at least one of the first playback control device 11 and the second playback control device 12 is ensured to be powered, such that the display device is always in the normal display state, and thus the reliability of the playback control system is improved.

Exemplarily, in the case that the power supply 30 has supplied power steadily, the first power supply circuit 21 is stopped from supplying power to the first playback control device 11, and the second power supply circuit 22 is stopped from supplying power to the second playback control device. In this way, the abnormal power supplied to the first playback control device 11 or the second playback control device 12 caused by the unstable power supply of the power supply 30 is avoided, such that the display device is prevented from abnormally displaying image data.

Optionally, in the embodiments, the power supply 30 is further configured to stop supplying power to the first playback control device 11 and the second playback control device 12 in response to the third power supply circuit 23 supplying power to the first playback control device 11 and the fourth power supply circuit 24 supplying power to the second playback control device 12.

In the case that the power supply 30 is always employed to supply power to the playback control devices, because the power of the power supply 30 is limited, the power supply 30 fails to supply power to the playback control device due to insufficient power. Therefore, the power supply 30 is stopped from supplying power in response to the third power supply circuit 23 and the fourth power supply circuit 24 supplying power, such that the reliability of the playback control system is further improved.

Figure 5:
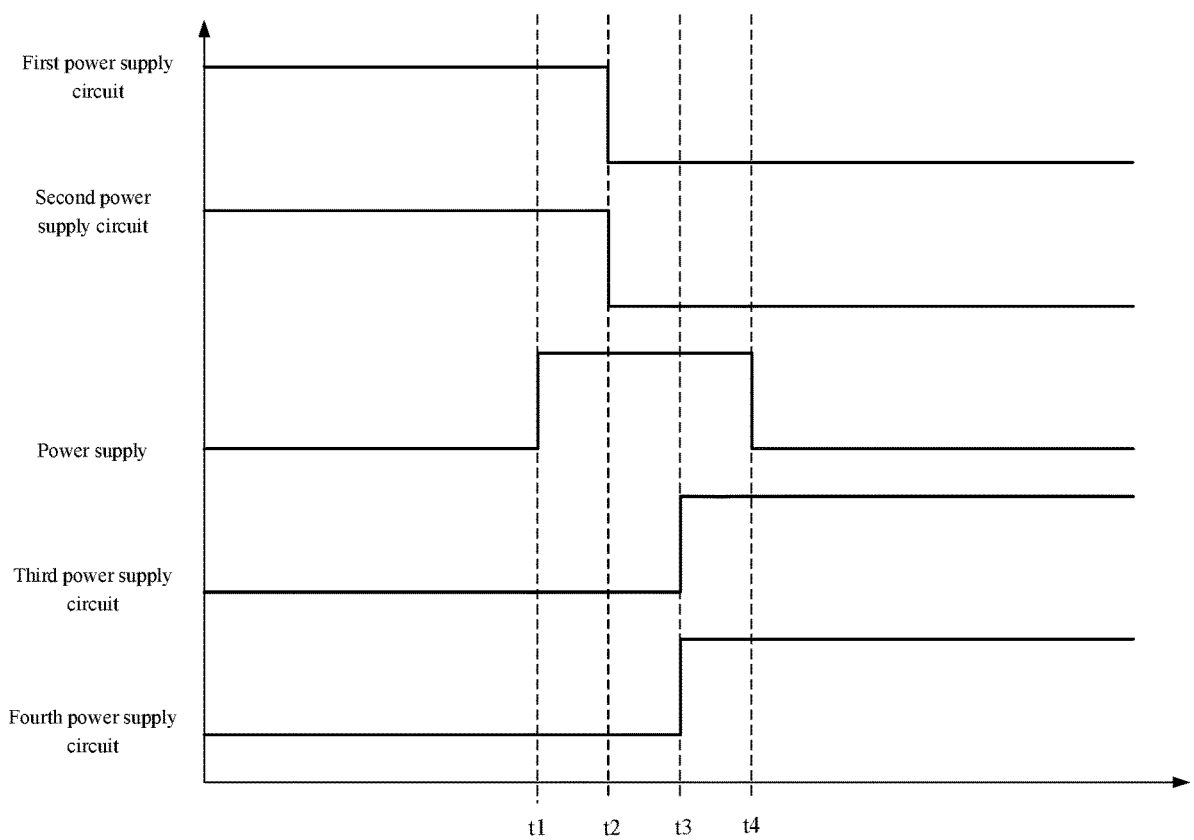
FIG. 5 is another power supply sequence diagram according to some embodiments of the present disclosure.

The power supply process in the embodiments of the present disclosure is described by the following examples. FIG. 5 is another power supply sequence diagram according to some embodiments of the present disclosure. In FIG. 5, a high level refers to a power supply state, and a low level refers to a power failure state.

As illustrated in FIG. 5, prior to an instant t1, the first playback control device 11 is powered by the first power supply circuit 21, and simultaneously the second playback control device 12 is powered by the second power supply circuit 22. In this case, one of the first playback control device 11 and the second playback control device 12 controls the display on the display device.

At the instant t1, at least one of the first playback control device 11 and the second playback control device 12 is powered by the power supply 30. In this case, the power supply state of the power supply 30 is unstable.

At an instant t2, the power supply state of the power supply 30 is stable, and in this case, the first power supply circuit 21 is stopped from supplying power to the first playback control device 11, and the second power supply circuit 22 is stopped from supplying power to the second playback control device 12. However, the power supply 30 supplies power to at least one of the first playback control device 11 and the second playback control device 12, and thus the first playback control device 11 or the second playback control device 12 controls the display on the display device.

At an instant t3, the first playback control device 11 is powered by the third power supply circuit 23, and simultaneously the second playback control device 12 is powered by the fourth power supply circuit 24. In this case, power supply states of the third power supply circuit 23 and the fourth power supply circuit 24 are unstable.

At an instant t4, the power supply states of the third power supply circuit 23 and the fourth power supply circuit 24 supply are stable, and in this case, the power supply 30 is stopped from supplying power. The display on the display device is controlled by one of the first playback control device 11 and the second playback control device 12.

In other examples, the instants t3 and t2 are the same. That is, the third power supply circuit 23 and the fourth power supply circuit 24 supply power, and simultaneously the first power supply circuit 21 and the second power supply circuit 22 are stopped from supplying power.

At least one of the first playback control device 11 and the second playback control device 12 is ensured to be powered steadily by stopping the first power supply circuit 21 and the second power supply circuit 22 from supplying power in the case that the power supply 30 has supplied power steadily and stopping the power supply 30 from supplying power in the case that the third power supply circuit 23 and the fourth power supply circuit 24 have supplied power steadily, such that at least one of the first playback control device 11 and the second playback control device 12 is still capable of operating normally even in case of voltage fluctuations.

In still other embodiments, the first playback control device 11 is powered by the third power supply circuit 23, and simultaneously the second playback control device 12 is powered by the fourth power supply circuit 24. The power supply 30 is further configured to supply power to the first playback control device 11 in response to a power failure in a process of supplying power to the first playback control device 11 by the third power supply circuit 23; or to supply power to the second playback control device 11 in response to a power failure in a process of supplying power to the second playback control device 12 by the fourth power supply circuit 24.

During a power failure in the third power supply circuit 23 and switching the power supply 30 to supply power to the first playback control device 11, the display device is still in the normal display state because the fourth power supply circuit 24 supplies power to the second playback control device 12. Similarly, during a power failure in the fourth power supply circuit 24 and switching the power supply 30 to supply power to the second playback control device 12, the display device is still in the normal display state because the third power supply circuit 23 supplies power to the first playback control device 11. In this way, at least one of the first playback control device 11 and the second playback control device 12 is powered, such that the display device is ensured to be always in the normal display state, and thus the reliability of the playback control system is improved.

Optionally, in some embodiments of the present disclosure, the playback control system further includes a detection unit (not illustrated in the figures).

In some examples, the detection unit is a host system such as a computer or a tablet. The detection unit determines whether the first power supply circuit 21, the second power supply circuit 22, the third power supply circuit 23, and the fourth power supply circuit 24 are in the power supply state by detecting whether the first playback control device 11 and the second playback control device 12 are in an online state.

For example, in the case that the detection unit detects that the first playback control device 11 is in the online state, it is determined that the first power supply circuit 21 or the third power supply circuit 23 is in the power supply state; and in the case that the detection unit detects that the first playback control device 11 is in a non-online state, it is determined that the first power supply circuit 21 or the third power supply circuit 23 is in a non-power supply state.

In other examples, the detection unit is a voltage acquisition device. The detection units are respectively arranged between the first power supply circuit 21 and the first playback control device 11, the third power supply circuit 23 and the first playback control device 11, the second power supply circuit 22 and the second playback control device 12, and the fourth power supply circuit 24 and the second playback control device 12.

In the case that the detection unit detects the voltage fluctuation, it is determined that the corresponding power supply circuit does not steadily supply power. In the case that the detection unit detects that the voltage is lower than a first defined threshold, it is determined that the corresponding power supply circuit is in the non-power supply state. In the case that the detection unit detects that the voltage is higher than a second defined threshold, it is determined that the corresponding power supply circuit is in the power supply state. Exemplarily, the second defined threshold is greater than the first defined threshold. The first defined threshold and the second defined threshold are determined by those skilled in the art.

Optionally, the detection unit is not arranged in the embodiments of the present disclosure. In the case that the first power supply circuit 21, the third power supply circuit 23, the second power supply circuit 22, the fourth power supply circuit 24, or the power supply 30 has been turned on for a defined period, it is determined that the first power supply circuit 21, the third power supply circuit 23, the second power supply circuit 22, and the fourth power supply circuit 24 are in the steady power supply state. Exemplarily, the defined period is 10 s, which is determined by those skilled in the art according to experiments.

Figure 6:
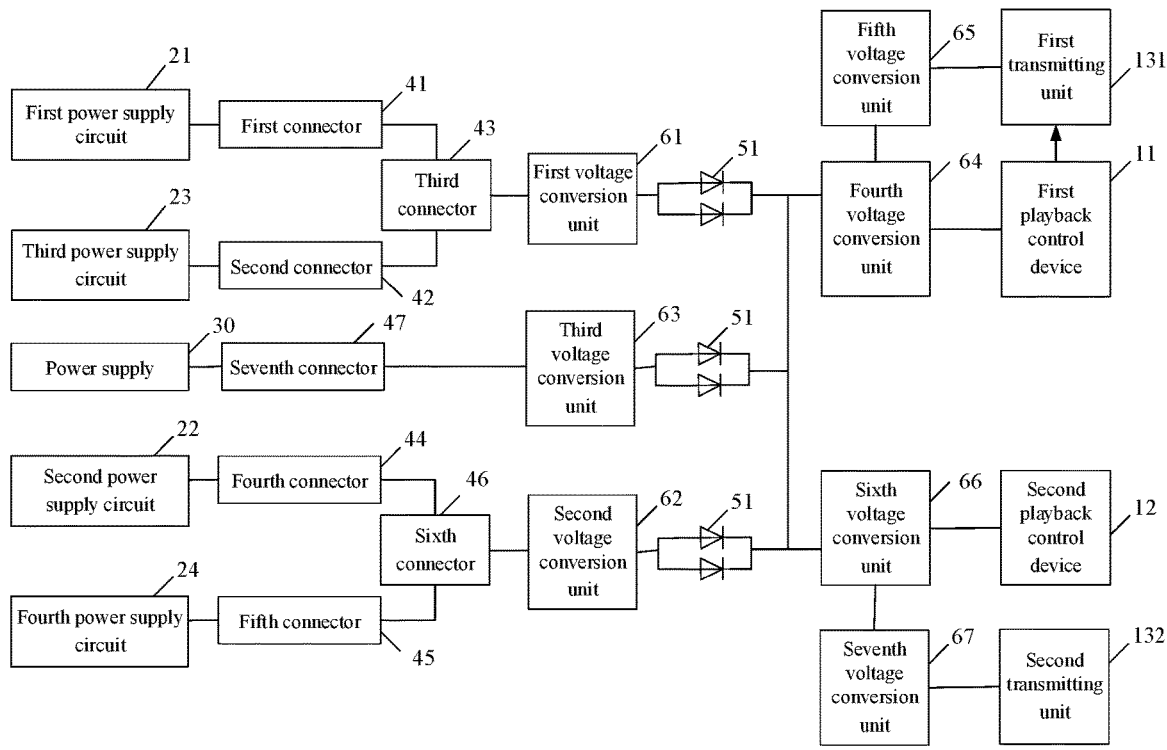
FIG. 6 is a schematic structural diagram of still another playback control system according to some embodiments of the present disclosure.

FIG. 6 is a schematic structural diagram of still another playback control system according to some embodiments of the present disclosure. As illustrated in FIG. 6, the playback control system further includes a connector.

Components in front of and behind the connector are electrically connected to each other by arranging the connector in at least one of the following positions: between the first power supply circuit 21 and the first playback control device 11, between the second power supply circuit 22 and the second playback control device 12, between the third power supply circuit 23 and the first playback control device 11, between the fourth power supply circuit 24 and the second playback control device 12, between the power supply 30 and the first playback control device 11; and between the power supply 30 and the second playback control device 12.

Exemplarily, the connector is an airline connector, which has the advantages of quick connection, quick separation, good environmental resistance, and high reliability.

In some examples, as illustrated in FIG. 6, a first connector 41, a second connector 42, and a third connector 43 are arranged between the first power supply circuit 21, the third power supply circuit 23 and the first playback control device 11. Exemplarily, the first connector 41 and the second connector 42 are plugs, and the third connector 43 is a socket. The first connector 41 and the second connector 42 are plugged into the third connector 43.

A fourth connector 44, a fifth connector 45, and a sixth connector 46 are arranged between the second power supply circuit 22, the fourth power supply circuit 24, and the second playback control device 12. Exemplarily, the fourth connector 44 and the fifth connector 45 are plugs, and the sixth connector 46 is a socket. The fourth connector 44 and the fifth connector 45 are plugged into the sixth connector 46.

A seventh connector 47 is arranged between the power supply 30 and the first playback control device 11 or the power supply 30 and the second playback control device 12. The seventh connector 47 includes a plug and a socket.

The first power supply circuit 21, the second power supply circuit 22, the third power supply circuit 23, the fourth power supply circuit 24, and the power supply 30 are easily plugged and unplugged by arranging the connector.

Optionally, in some embodiments of the present disclosure, the playback control system further includes a protection circuit. The protection circuit includes a diode 51 or a plurality of diodes 51 connected in parallel. The description is given in FIG. 6 only using a scenario where the protection circuit includes two diodes 51 connected in parallel as an example.

The protection circuit is arranged in at least one of the following positions: between the first power supply circuit 21 and the first playback control device 11, between the second power supply circuit 22 and the second playback control device 12, between the third power supply circuit 23 and the first playback control device 11, between the fourth power supply circuit 24 and the second playback control device 12, and between the power supply 30 and the first playback control device 11 and the second playback control device 12.

An input terminal of each of the diodes 51 in the protection circuit is connected to the first power supply circuit 21, the second power supply circuit 22, the third power supply circuit 23, the fourth power supply circuit 24, or the power supply 30, and an output terminal of each of the diodes 51 is connected to the first playback control device 11 or the second playback control device 12.

The diode 51 is unidirectional conductive, and the current only flows into the input terminal of the diode 51 from the input terminal. Therefore, by arranging the protection circuit, damage to the first power supply circuit 21, the second power supply circuit 22, the third power supply circuit 23, the fourth power supply circuit 24, or the power supply 30, or damage to the first playback control device 11 and the second playback control device 12, due to reversing positive and negative electrodes of the first power supply circuit 21, the second power supply circuit 22, the third power supply circuit 23, the fourth power supply circuit 24, or the power supply 30, is avoided.

Optionally, in some embodiments of the present disclosure, the playback control system further includes a first voltage conversion unit 61, a second voltage conversion unit 62, a third voltage conversion unit 63, a fourth voltage conversion unit 64, a fifth voltage conversion unit 65, a sixth voltage conversion unit 66, and a seventh voltage conversion unit 67.

One terminal of the first voltage conversion unit 61 is connected to one terminal of the third connector 43, and the other terminal of the first voltage conversion unit 61 is connected to an input terminal of the protection circuit. One terminal of the second voltage conversion unit 62 is connected to one terminal of the sixth connector 46, and the other terminal of the second voltage conversion unit 62 is connected to the input terminal of the protection circuit. One terminal of the third voltage conversion unit 63 is connected to one terminal of the seventh connector 47, and the other terminal of the third voltage conversion unit 63 is connected to the input terminal of the protection circuit.

Exemplarily, the first voltage conversion unit 61, the second voltage conversion unit 62, and the third voltage conversion unit 63 are alternating current-direct current (AC-DC) converters. The first voltage conversion unit 61, the second voltage conversion unit 62, and the third voltage conversion unit 63 are configured to convert 220 V AC voltages into 24 V direct current (DC) voltages.

The DC voltages acquired by the conversion of the first voltage conversion unit 61, the second voltage conversion unit 62, and the third voltage conversion unit 63 are arranged according to actual needs.

A first terminal of the fourth voltage conversion unit 64 is connected to an output terminal of the protection circuit, and a second terminal of the fourth voltage conversion unit 64 is connected to the first playback control device 11. A first terminal of the sixth voltage conversion unit 66 is connected to the output terminal of the protection circuit, and a second terminal of the sixth voltage conversion unit 66 is connected to the second playback control device 12.

Exemplarily, the fourth voltage conversion unit 64 and the sixth voltage conversion unit 66 are direct current-direct current (DC-DC) converters.

The fourth voltage conversion unit 64 is configured to convert the DC voltage output from the first voltage conversion unit 61 into a supply voltage of the first playback control device 11. The sixth voltage conversion unit 66 is configured to convert the DC voltage output from the second voltage conversion unit 62 into a supply voltage of the second playback control device 12.

Exemplarily, the supply voltages of both the first playback control device 11 and the second playback control device 12 are 12 V.

One terminal of the fifth voltage conversion unit 65 is connected to a third terminal of the fourth voltage conversion unit 64, and the other terminal of the fifth voltage conversion unit 65 is connected to the first transmitting unit 131. One terminal of the seventh voltage conversion unit 67 is connected to a third terminal of the sixth voltage conversion unit, and one terminal of the seventh voltage conversion unit 67 is connected to the second transmitting unit 132.

Exemplarily, the fifth voltage conversion unit 65 and the seventh voltage conversion unit 67 are DC-DC converters.

The fifth voltage conversion unit 65 is configured to convert the voltage output from the fourth voltage conversion unit 64 into a supply voltage of the first transmitting unit 131. The seventh voltage conversion unit 67 is configured to convert the voltage output by the sixth voltage conversion unit 66 into a supply voltage of the second transmitting unit 132.

Optionally, in some embodiments of the present disclosure, the third voltage conversion unit 63 is not arranged, and the plug of the seventh connector 47 is directly plugged into the third connector 43 or the sixth connector 46.

The playback control system illustrated in FIG. 6 uses the power supply sequence illustrated in FIG. 4 and FIG. 5 to perform the power supply control.

In some examples, in response to the power failure in one of the first power supply circuit 21, the second power supply circuit 22, the third power supply circuit 23, and the fourth power supply circuit 24, the power supply sequence diagram illustrated in FIG. 4 is used to perform the power supply control.

In practice, the power failure in the first power supply circuit 21, the third power supply circuit 23, the second power supply circuit 22, or the fourth power supply circuit 24 is caused by, but not limited to, the following cases: a connection line between the power supply circuit and the connector is damaged; a power supply output of the power supply circuit is abnormal; the contact between the connectors is poor; and the voltage conversion unit is damaged.

In other examples, in the case that a voltage of the utility power is unstable, the utility power needs to be disconnected for maintenance; or, in the case the utility power needs to be switched, the power supply sequence diagram illustrated in FIG. 5 is used to perform the power supply control.

Figure 7:
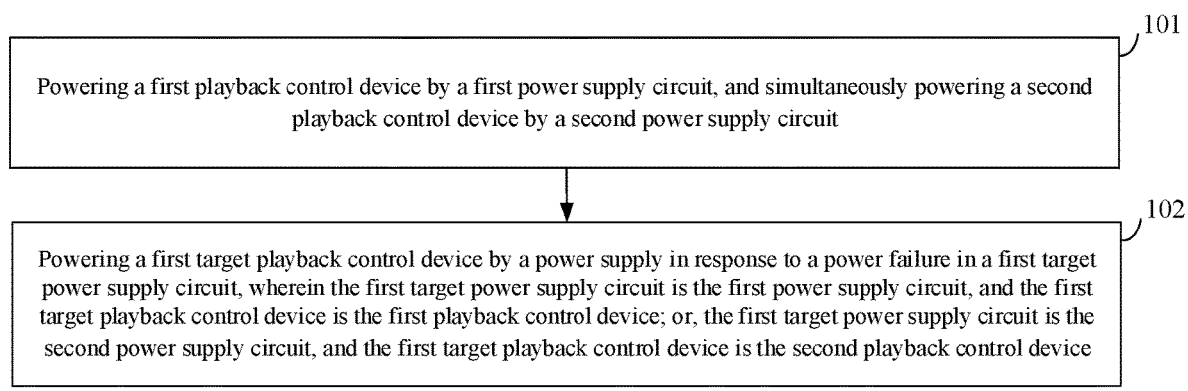
FIG. 7 is a flowchart of a power supply method for a playback control system according to some embodiments of the present disclosure.

FIG. 7 is a flowchart of a power supply method for a playback control system according to some embodiments of the present disclosure, applicable to the playback control system illustrated in FIG. 1. Referring to FIG. 7, the method includes the following steps.

In step 101, a first playback control device is powered by a first power supply circuit, and simultaneously a second playback control device is powered by a second power supply circuit.

In step 102, a first target playback control device is powered by a power supply in response to a power failure in a first target power supply circuit.

The first target power supply circuit is the first power supply circuit, and the first target playback control device is the first playback control device; or, the first target power supply circuit is the second power supply circuit, and the first target playback control device is the second playback control device.

In some embodiments of the present disclosure, during a power failure in the first power supply circuit and switching the power supply to supply power to the first playback control device, the display device is still in a normal display state because the second power supply circuit supplies power to the second playback control device. Similarly, during a power failure in the second power supply circuit and switching the power supply to supply power to the second playback control device, the display device is still in the normal display state because the first power supply circuit supplies power to the first playback control device. In this way, at least one of the first playback control device and the second playback control device is powered, such that the display device is ensured to be always in the normal display state, and thus reliability of the playback control system is improved.

Optionally, in some embodiments of the present disclosure, the power supply method further includes: stopping supplying power to the first target playback control device by the power supply upon a power resumption of the first target power supply circuit.

Optionally, in some embodiments of the present disclosure, the playback control system further includes a third power supply circuit and a fourth power supply circuit. The power supply method further includes: supplying power to the first playback control device by the power supply in response to a power failure in a process of supplying power to the first playback control device by the third power supply circuit; or supplying power to the second playback control device by the power supply in response to a power failure in a process of supplying power to the second playback control device by the fourth power supply circuit.

Figure 8:
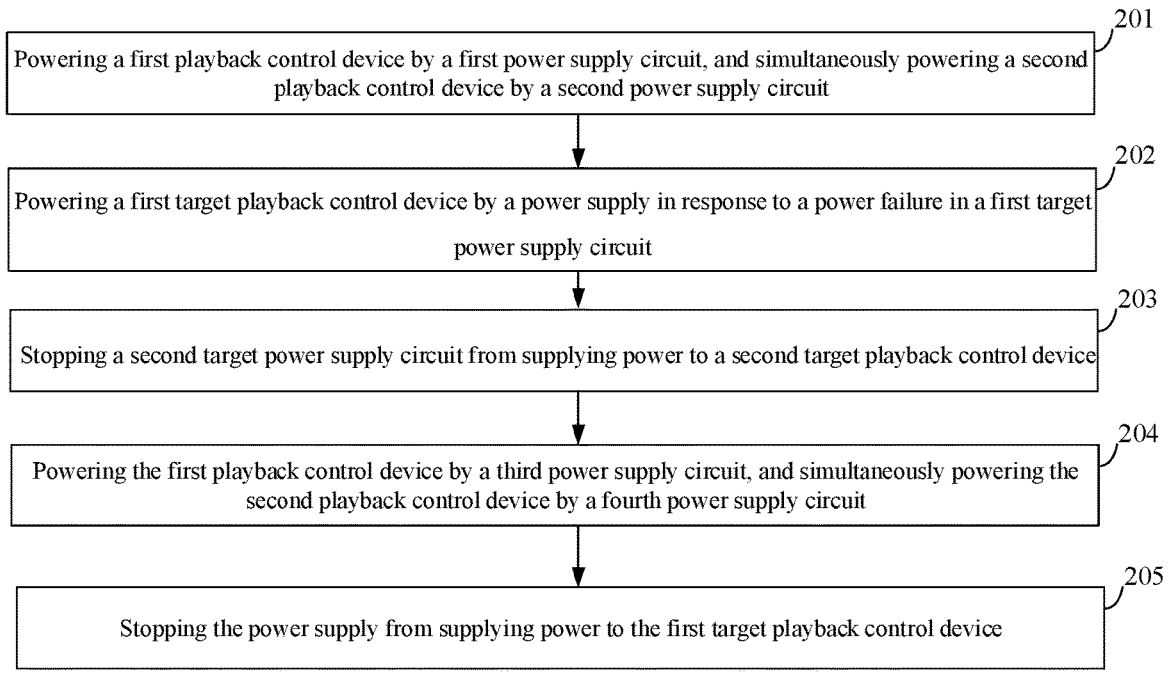
FIG. 8 is a flowchart of another power supply method for a playback control system according to some embodiments of the present disclosure.

FIG. 8 is a flowchart of another power supply method for a playback control system according to some embodiments of the present disclosure. As illustrated in FIG. 8, the method includes the following steps.

In step 201, a first playback control device is powered by a first power supply circuit, and simultaneously a second playback control device is powered by a second power supply circuit.

In step 202, a first target playback control device is powered by a power supply in response to a power failure in a first target power supply circuit.

The first target power supply circuit is the first power supply circuit, and the first target playback control device is the first playback control device; or, the first target power supply circuit is the second power supply circuit, and the first target playback control device is the second playback control device.

In step 203, a second target power supply circuit is stopped from supplying power to a second target playback control device.

The second target power supply circuit is a power supply circuit, other than the first target power supply circuit, in the first power supply circuit and the second power supply circuit, and the second target playback control device is a playback control device connected to the second target power supply circuit.

In step 204, the first playback control device is powered by a third power supply circuit, and simultaneously the second playback control device is powered by a fourth power supply circuit.

In step 205, the power supply is stopped from supplying power to the first target playback control device.

In some embodiments of the present disclosure, during the power failure in the first target power supply circuit, the second target power supply circuit supplies power to the second target playback control device, and thus the second target playback control device continues to control the display on the display device. Upon stopping supplying power to the second target playback control device by the second target power supply circuit, and during switching the third power supply circuit to supply power to the first playback control device and switching the fourth power supply circuit to supply power to the second playback control device, the power supply supplies power to the first target playback control device, and thus the first target playback control device continues to control the display on the display device. In this way, at least one of the first playback control device and the second playback control device is ensured to be powered, such that the display device is always in a normal display state, and reliability of the playback control system is improved.

Figure 9:
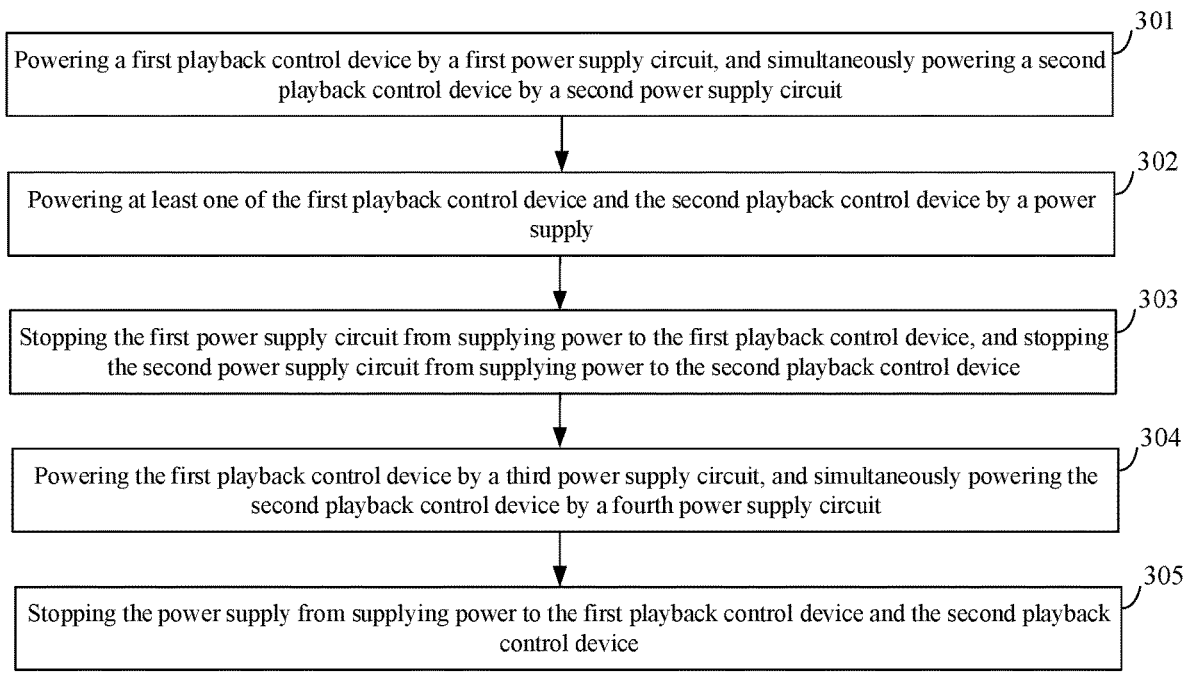
FIG. 9 is a flowchart of still another power supply method for a playback control system according to some embodiments of the present disclosure.

FIG. 9 is a flowchart of still another power supply method for a playback control system according to some embodiments of the present disclosure. As illustrated in FIG. 9, the method includes the following steps.

In step 301, a first playback control device is powered by a first power supply circuit, and simultaneously a second playback control device is powered by a second power supply circuit.

In step 302, at least one of the first playback control device and the second playback control device is powered by a power supply.

In step 303, the first power supply circuit is stopped from supplying power to the first playback control device, and the second power supply circuit is stopped from supplying power to the second playback control device.

In step 304, the first playback control device is powered by a third power supply circuit, and simultaneously the second playback control device is powered by a fourth power supply circuit.

In step 305, the power supply is stopped from supplying power to the first playback control device and the second playback control device.

In some embodiments of the present disclosure, in the case that the first power supply circuit supplies power to the first playback control device and the second power supply circuit supplies power to the second playback control device, the power supply supplies power to at least one of the first playback control device and the second playback control device, such that the power supply supplies power to at least one of the first playback control device and the second playback control device, during power failures in the first power supply circuit and the second power supply circuit, and during switching the third power supply circuit to supply power to the first playback control device and switching the fourth power supply circuit to supply power to the second playback control device. In this way, at least one of the first playback control device and the second playback control device is ensured to be powered, such that the display device is always in a normal display state, and reliability of the playback control system is improved.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A playback control system, comprising: a first playback control device, a second playback control device, a first power supply circuit, a second power supply circuit, and a power supply; wherein
 the first playback control device and the second playback control device are configured to control display on a same display device;
 the first power supply circuit is connected to the first playback control device, and configured to supply power to the first playback control device using a first utility power;
 the second power supply circuit is connected to the second playback control device, and configured to supply power to the second playback control device using the first utility power; and
 the power supply is connected to the first playback control device and the second playback control device, and configured to supply power to a first target playback control device in response to a power failure in a first target power supply circuit;
 wherein the first target power supply circuit is the first power supply circuit, and the first target playback control device is the first playback control device; or, the first target power supply circuit is the second power supply circuit, and the first target playback control device is the second playback control device,
 wherein the playback control system further comprising:
 a third power supply circuit and a fourth power supply circuit; wherein
 the third power supply circuit is connected to the first playback control device, and configured to supply power to the first playback control device using a second utility power; and
 the fourth power supply circuit is connected to the second playback control device, and configured to supply power to the second playback control device using the second utility power.

2. The system according to claim 1, wherein the power supply is further configured to stop supplying power to the first target playback control device in response to a power resumption of the target power supply circuit.

3. The system according to claim 1, wherein
 the second utility power and the first utility power belong to different suppliers and/or power supply stations; and
 at a same instant, at least one of the first power supply circuit or the third power supply circuit supplies power to the first playback control device, and at least one of the second power supply circuit or the fourth power supply circuit supplies power to the second playback control device.

4. The system according to claim 3, wherein the power supply is further configured to supply power to the first playback control device in response to a power failure in a process of supplying power to the first playback control device by the third power supply circuit; or configured to supply power to the second playback control device in response to a power failure in a process of supplying power to the second playback control device by the fourth power supply circuit.

5. The system according to claim 3, wherein
 a second target power supply circuit in the first power supply circuit and the second power supply circuit is configured to stop supplying power to a second target playback control device in response to the power failure in the first target power supply circuit and the power supply supplying power to the first target playback control device, wherein the second target power supply circuit is a power supply circuit in the first power supply circuit and the second power supply circuit other than the first target power supply circuit, and the second target playback control device is a playback control device connected to the second target power supply circuit;
 the third power supply circuit is configured to supply power to the first playback control device in response to the power supply supplying power to the first target playback control device; and
 the fourth power supply circuit is configured to supply power to the second playback control device in response to the power supply supplying power to the first target playback control device.

6. The system according to claim 3, wherein
 the power supply is further configured to supply power to at least one of the first playback control device or the second playback control device in response to the first power supply circuit supplying power to the first playback control device and the second power supply circuit supplying power to the second playback control device;
 the third power supply circuit is further configured to supply power to the first playback control device in response to a power failure in the first power supply circuit and the power supply supplying power to at least one of the first playback control device or the second playback control device; and
 the fourth power supply circuit is further configured to supply power to the second playback control device in response to a power failure in the second power supply circuit and the power supply supplying power to at least one of the first playback control device or the second playback control device.

7. The system according to claim 5, wherein the power supply is further configured to stop supplying power to the first playback control device and the second playback control device in response to the third power supply circuit supplying power to the first playback control device and the fourth power supply circuit supplying power to the second playback control device.

8. The system according to claim 1, further comprising: a connector, wherein components in front of and behind the connector are electrically connected to each other by arranging the connector in at least one of following positions:
 between the first power supply circuit and the first playback control device;

between the second power supply circuit and the second playback control device;

between the third power supply circuit and the first playback control device;

between the fourth power supply circuit and the second playback control device;

between the power supply and the first playback control device; or between the power supply and the second playback control device.

9. The system according to claim 1, further comprising: a protection circuit; wherein the protection circuit comprises a diode, or the protection circuit comprises a plurality of diodes connected in parallel; and the protection circuit is arranged in at least one of following positions:

between the first power supply circuit and the first playback control device;

between the second power supply circuit and the second playback control device;

between the third power supply circuit and the first playback control device;

between the fourth power supply circuit and the second playback control device;

between the power supply and the first playback control device; or between the power supply and the second playback control device.

10. A power supply method for a playback control system, applicable to the system as defined in claim 1, the method comprising:

supplying power to a first playback control device by a first power supply circuit, and simultaneously supplying power to a second playback control device by a second power supply circuit; and supplying power to a first target playback control device by a power supply in response to a power failure in a first target power supply circuit;

wherein the first target power supply circuit is the first power supply circuit, and the first target playback control device is the first playback control device; or, the first target power supply circuit is the second power supply circuit, and the first target playback control device is the second playback control device.

11. The method according to claim 10, further comprising:

in response to a power resumption of the first target power supply circuit, stopping supplying power to the first target playback control device by the power supply.

12. The method according to claim 10, applicable to the system as defined in claim 1, the method further comprising:

supplying power to the first playback control device by the power supply in response to a power failure in a process of supplying power to the first playback control device by a third power supply circuit; or supplying power to the second playback control device by the power supply in response to a power failure in a process of supplying power to the second playback control device by a fourth power supply circuit.

13. The method according to claim 10, applicable to the system as defined in claim 1, the method further comprising:

stopping supplying power to a second target playback control device by a second target power supply circuit, wherein the second target power supply circuit is a power supply circuit in the first power supply circuit and the second power supply circuit other than the first target power supply circuit, and the second target playback control device is a playback control device connected to the second target power supply circuit; and supplying power to the first playback control device by a third power supply circuit, and simultaneously supplying power to the second playback control device by a fourth power supply circuit.

14. The method according to claim 10, applicable to the system as defined in claim 1, the method further comprising:

supplying power to at least one of the first playback control device or the second playback control device by the power supply in response to the first power supply circuit supplying power to the first playback control device and the second power supply circuit supplying power to the second playback control device;

stopping supplying power to the first playback control device by the first power supply circuit, and stopping supplying power to the second playback control device by the second power supply circuit; and supplying power to the first playback control device by a third power supply circuit, and simultaneously supplying power to the second playback control device by a fourth power supply circuit.

15. The method according to claim 13, further comprising:

stopping supplying power to the first playback control device and the second playback control device by the power supply.

16. The system according to claim 6, wherein the power supply is further configured to stop supplying power to the first playback control device and the second playback control device in response to the third power supply circuit supplying power to the first playback control device and the fourth power supply circuit supplying power to the second playback control device.

17. The system according to claim 3, further comprising: a connector, wherein components in front of and behind the connector are electrically connected to each other by arranging the connector in at least one of following positions:

between the first power supply circuit and the first playback control device;

between the second power supply circuit and the second playback control device;

between the third power supply circuit and the first playback control device;

between the fourth power supply circuit and the second playback control device;

between the power supply and the first playback control device; or between the power supply and the second playback control device.

18. The system according to claim 3, further comprising: a protection circuit; wherein the protection circuit comprises a diode, or the protection circuit comprises a plurality of diodes connected in parallel; and the protection circuit is arranged in at least one of following positions:

between the first power supply circuit and the first playback control device;

between the second power supply circuit and the second playback control device;

between the third power supply circuit and the first playback control device;

between the fourth power supply circuit and the second playback control device;

between the power supply and the first playback control device; or between the power supply and the second playback control device.

19. The method according to claim 14, further comprising:

stopping supplying power to the first playback control device and the second playback control device by the power supply.

* * * * *